(12) United States Patent
Hu et al.

(10) Patent No.: US 10,656,670 B2
(45) Date of Patent: May 19, 2020

(54) HEAD-MOUNTED DISPLAY DEVICE (71) Applicant: HTC Corporation, Taoyuan (TW)

(72) Inventors: Chih-Kai Hu, Taoyuan (TW); Yu-Jing Liao, Taoyuan (TW); I-Hsuan Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/996,543

(22) Filed: Jun. 4, 2018

(65) Prior Publication Data
US 2019/0369659 A1    Dec. 5, 2019

(51) Int. Cl.
A45F 5/00      (2006.01)
G06F 1/16      (2006.01)

(52) U.S. Cl.
CPC .............. G06F 1/1601 (2013.01); A45F 5/00 (2013.01); A45F 2200/0525 (2013.01)

(58) Field of Classification Search
CPC ............ G02B 27/0174; G02B 27/0176; G02B 27/0179; G02B 27/017; G02B 7/002; A42B 3/08; A42B 3/085; A42B 3/14; A42B 3/142; A42B 3/145; Y10T 24/21; Y10T 24/2179; Y10T 24/2187
See application file for complete search history.

(56) References Cited

U.S. PATENT DOCUMENTS

| 5,321,416 A | 6/1994 | Bassett et al. |
| 5,767,820 A | 6/1998 | Bassett et al. |
| 6,369,952 B1 | 4/2002 | Rallison et al. |
| 7,124,425 B1 | 10/2006 | Anderson, Jr. et al. |
| 7,174,575 B1 * | 2/2007 | Scherer ................. A42B 3/145 2/418 |
| 8,336,114 B1 * | 12/2012 | Lee ........................ A42B 3/145 2/9 |
| 9,557,569 B2 * | 1/2017 | Tazbaz ............... G02B 27/0179 |
| 10,209,738 B1 * | 2/2019 | Tompkins ............... G06F 1/163 |
| 2006/0225187 A1 * | 10/2006 | Wu ......................... A42B 3/145 2/425 |

(Continued)

FOREIGN PATENT DOCUMENTS

| CN | 101937132 | 1/2011 |
| CN | 106707509 | 5/2017 |
| TW | 201540216 | 11/2015 |

OTHER PUBLICATIONS

"Office Action of Taiwan Counterpart Application", dated Oct. 31, 2018, p. 1-p. 3.

*Primary Examiner* — Brian D Nash
(74) *Attorney, Agent, or Firm* — JCIPRNET (57) ABSTRACT A head-mounted display device including a front piece, a plurality of headbands, and an adjustment mechanism is provided. The front piece is provided with or adapted to house a display device. An end of each of the headbands is connected to the front piece. The adjustment mechanism includes a base, a turntable, and a knob. The turntable and the knob are pivoted to the base on an axis of rotation. The turntable has a plurality of satellite points. Each of the satellite points is spaced apart from the axis of rotation, and another end of each of the headbands is connected to the corresponding satellite point. By turning the knob to rotate the turntable, the headbands are wound around the periphery of the satellite points to simultaneously reduce the length of use of the headbands.

12 Claims, 8 Drawing Sheets (56) References Cited

U.S. PATENT DOCUMENTS

| | | | | |
|---|---|---|---|---|
| 2010/0095438 A1* | 4/2010 | Moelker | A42B 3/145 | |
| | | | 2/418 | |
| 2010/0170068 A1* | 7/2010 | Musal | A42B 3/145 | |
| | | | 24/68 D | |
| 2010/0251524 A1* | 10/2010 | Chen | A43C 7/00 | |
| | | | 24/713.2 | |
| 2011/0127305 A1* | 6/2011 | Yates | G02B 7/002 | |
| | | | 224/181 | |
| 2012/0167281 A1* | 7/2012 | Gennrich | A42B 3/145 | |
| | | | 2/410 | |
| 2012/0296245 A1* | 11/2012 | Ma | A42B 3/145 | |
| | | | 601/84 | |
| 2013/0239303 A1* | 9/2013 | Cotterman | A42B 3/08 | |
| | | | 2/417 | |
| 2014/0109301 A1* | 4/2014 | Hall | A42B 3/142 | |
| | | | 2/416 | |
| 2015/0026871 A1* | 1/2015 | Gotti | A42B 3/0406 | |
| | | | 2/418 | |
| 2015/0059065 A1* | 3/2015 | Klotz | A42B 3/145 | |
| | | | 2/418 | |
| 2015/0107006 A1* | 4/2015 | Chen | A42B 3/324 | |
| | | | 2/418 | |
| 2015/0191326 A1* | 7/2015 | Hall | A42B 3/08 | |
| | | | 242/396.4 | |
| 2016/0174648 A1* | 6/2016 | Garneau | A42B 3/142 | |
| | | | 2/421 | |
| 2016/0249124 A1 | 8/2016 | Drinkwater et al. | | |
| 2016/0270470 A1* | 9/2016 | Hickman | A42B 3/08 | |
| 2017/0055623 A1* | 3/2017 | Pritz | A42B 3/145 | |
| 2017/0075121 A1 | 3/2017 | Chen et al. | | |
| 2017/0143070 A1* | 5/2017 | Cram | A42B 3/145 | |
| 2017/0273390 A1* | 9/2017 | Maloney | A42B 3/145 | |
| 2017/0347736 A1* | 12/2017 | Penner | A42B 3/066 | |
| 2018/0092424 A1* | 4/2018 | Hall | A42B 3/142 | |
| 2018/0177259 A1* | 6/2018 | Huh | A42B 3/085 | |
| 2018/0364490 A1* | 12/2018 | Lin | A42B 1/245 | |
| 2019/0029355 A1* | 1/2019 | Seo | A42B 3/145 | |

* cited by examiner

HEAD-MOUNTED DISPLAY DEVICE

BACKGROUND

Technical Field

The application relates to a display device, and more particularly, to a head-mounted display device.

Description of Related Art

With the development of the technology industry, the type, function and use of electronic devices are increasingly diverse, and a wearable electronic device that can be directly worn on the body of a user has also been invented. Many types of the head-mounted electronic device exist, and in the case of an eye mask-type head-mounted electronic device or the like, after the user wears the electronic device, in addition to seeing a 3D image, the image is also changed with the rotation of the head of the user to provide the user with a more immersive experience.

The head-mounted display device generally adopts two or three headbands to position a front piece to the face of the user, and a portion of or the entirety of each of the headbands can be elastically extended to adapt to the head of different users. Moreover, the length of use of the headbands can be adjusted to achieve the most comfortable state. However, the headbands need to be adjusted one at a time, and therefore the time of positioning the head-mounted display device on the head of the user is increased.

SUMMARY

The application provides a head-mounted display device for which the length of use of a plurality of headbands can be simultaneously adjusted to reduce the time of positioning the head-mounted display device to the head of a user.

A head-mounted display device of the application includes a front piece, a plurality of headbands, and an adjustment mechanism. The front piece is provided with or adapted to house a display device. An end of each of the headbands is connected to the front piece. The adjustment mechanism includes a base, a turntable, and a knob. The base has a first rotation limiting portion and a first locking portion. The turntable is pivoted to the base along an axis of rotation and has a plurality of satellite points. Each of the satellite points is spaced apart from the axis of rotation, and another end of each of the headbands is connected to the corresponding satellite point. The knob is pivoted to the base along the axis of rotation to drive the turntable to rotate relative to the base on the axis of rotation.

In an embodiment of the application, the knob has a second rotation limiting portion and a second locking portion. When the first locking portion and the second locking portion fit each other, the second rotation limiting portion and the first rotation limiting portion fit each other to prevent the turntable from rotating relative to the base on the axis of rotation. When the knob is translated relative to the base on the axis of rotation such that the second locking portion is separated from the first locking portion and the second rotation limiting portion is separated from the first rotation limiting portion, turning the knob relative to the base on the axis of rotation can rotate the turntable relative to the base on the axis of rotation such that the headbands are wound around the periphery of the satellite points.

In an embodiment of the application, a portion of the base forms a pad.

In an embodiment of the application, each of the headbands has an elastic string to be connected to the corresponding satellite point.

In an embodiment of the application, each of the satellite points is a cylinder having an annular groove to be wound by the corresponding elastic string.

In an embodiment of the application, the first rotation limiting portion and the second rotation limiting portion are respectively a pair of crown gears surrounding the axis of rotation that can be engaged with each other.

In an embodiment of the application, when the second locking portion is separated from the first locking portion, the first locking portion limits the translation of the knob relative to the base on the axis of rotation.

In an embodiment of the application, the turntable has a first rotation driving portion, the knob has a second rotation driving portion, and the second rotation driving portion and the first rotation driving portion fit each other to drive the translation of the turntable relative to the base on the axis of rotation.

In an embodiment of the application, the turntable has a first translation limiting portion, the knob has a second translation limiting portion, and the second translation limiting portion and the first translation limiting portion fit each other to limit the translation of the turntable relative to the knob on the axis of rotation.

In an embodiment of the application, the turntable has a first axial sleeve, the knob has a second axial sleeve, and the second axial sleeve is fitted with the first axial sleeve to be translated relative to the base on the axis of rotation.

In an embodiment of the application, when the second locking portion is separated from the first locking portion, the first locking portion limits the translation of the second axial sleeve on the axis of rotation to limit the translation of the knob relative to the base on the axis of rotation.

In an embodiment of the application, the base has a third axial sleeve, and the third axial sleeve is disposed in the first axial sleeve and the second axial sleeve to be translated relative to the base on the axis of rotation.

In an embodiment of the application, the knob has a axial hole, a hole cover, and a fourth axial sleeve, the second locking portion is located inside the axial hole, the hole cover seals an end of the axial hole, and the fourth axial sleeve is disposed in the third axial sleeve.

Based on the above, in the embodiments of the application, the length of use of a plurality of headbands can be simultaneously adjusted via an adjustment mechanism to reduce the time of positioning the head-mounted display device to the head of the user.

In order to make the aforementioned features and advantages of the application more comprehensible, embodiments accompanied with figures are described in detail below.

DESCRIPTION OF THE EMBODIMENTS

Figure 1:
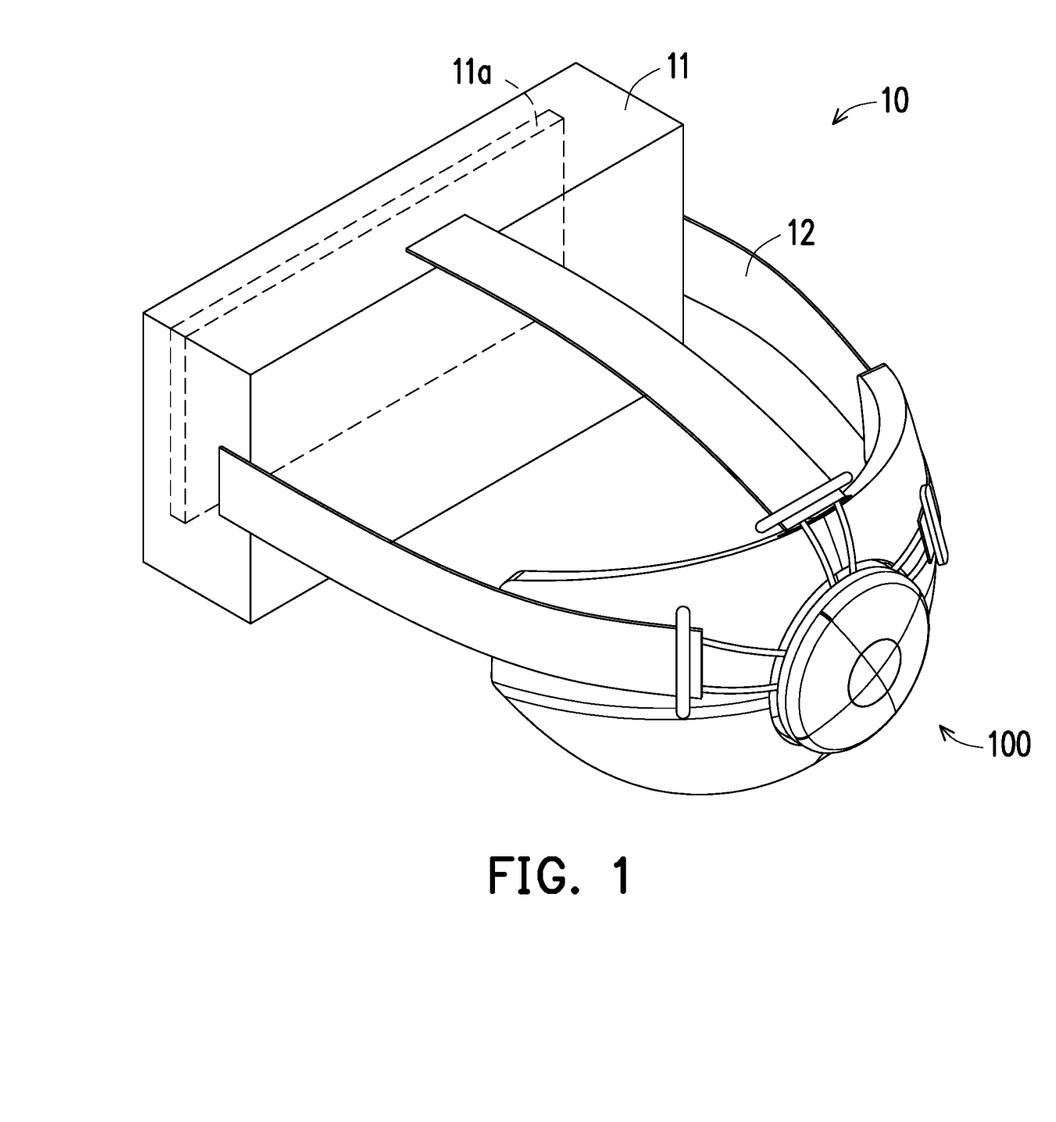
FIG. 1 is a perspective view of a head-mounted display device according to an embodiment of the application.
Figure 2:
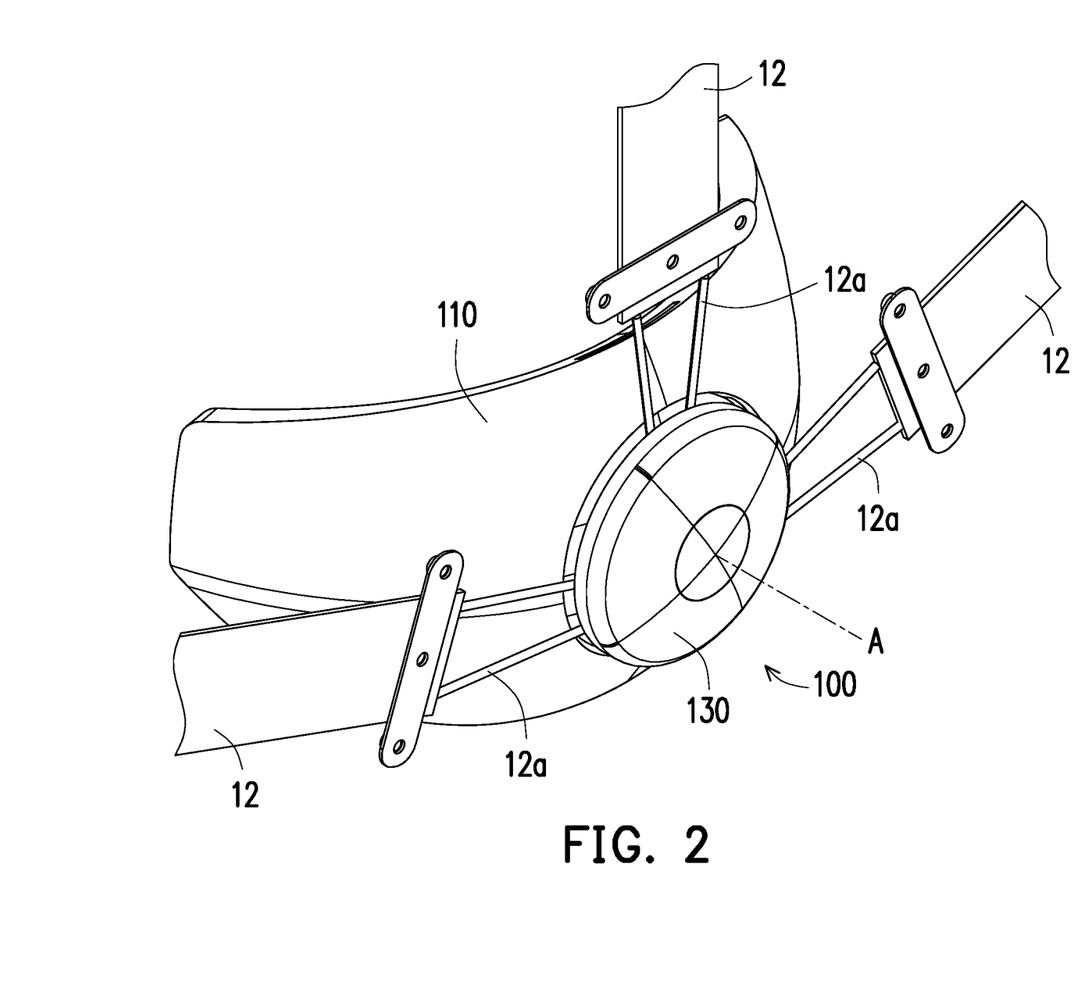
FIG. 2 is a perspective view of some components of the head-mounted display device of FIG. 1.

Referring to FIG. 1 and FIG. 2, a head-mounted display device 10 includes a front piece 11, a plurality of headbands 12, and an adjustment mechanism 100. An end of each of the headbands 12 is connected to the front piece 11, and another end of each of the headbands 12 is connected to the adjustment mechanism 100. A user can simultaneously adjust the length of use of the headbands 12 (roughly the distance of each of the headbands 12 from the front piece 11 to the adjustment mechanism 100 through the head of the user) via the adjustment mechanism 100, such that the time of positioning the head-mounted display device 10 to the head of the user is reduced. The headbands 12 can include an annular collar, and the collar is disposed at two ends or one end of the headbands 12 to wrap the adjustment mechanism 100 or the front piece 11. In the embodiment, the front piece 11 can include components such as an optical system (not shown) and a protective shell, and can be provided with a display 11a or adapted to house the display 11a. The display 11a can be a built-in display 11a or an external portable display 11a (such as a smart phone), but the application is not limited thereto. The type of the display 11a can be adjusted according to the application of the head-mounted display device 10 in a virtual reality system, augmented reality system, or mixed reality system. The optical system includes an optical element for changing the optical path of the display 11a, such as a lens, light guide element, or prism.

Figure 3A:
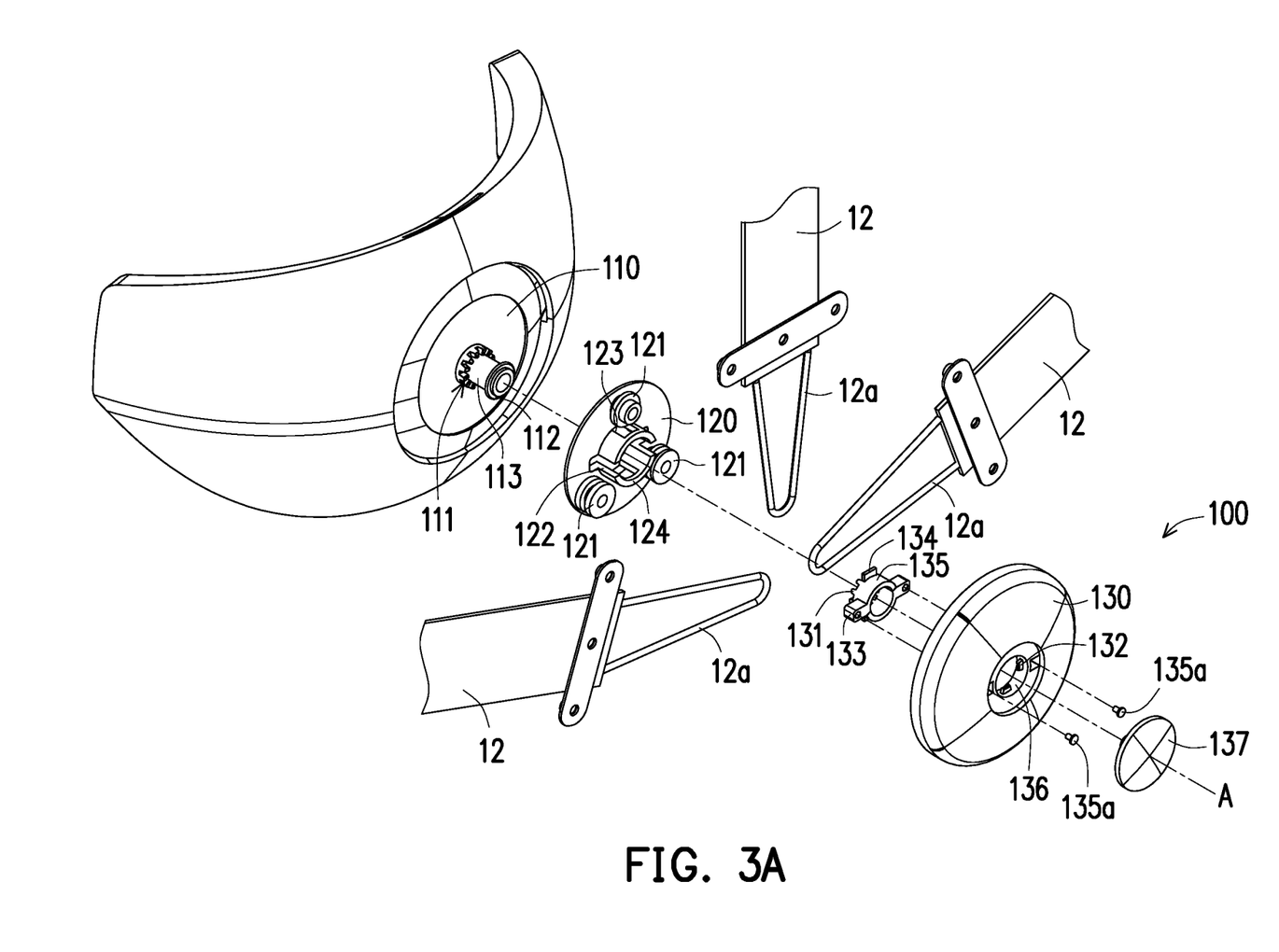
FIG. 3A is an exploded view of some components of the head-mounted display device of FIG. 2 at an angle of view.
Figure 3B:
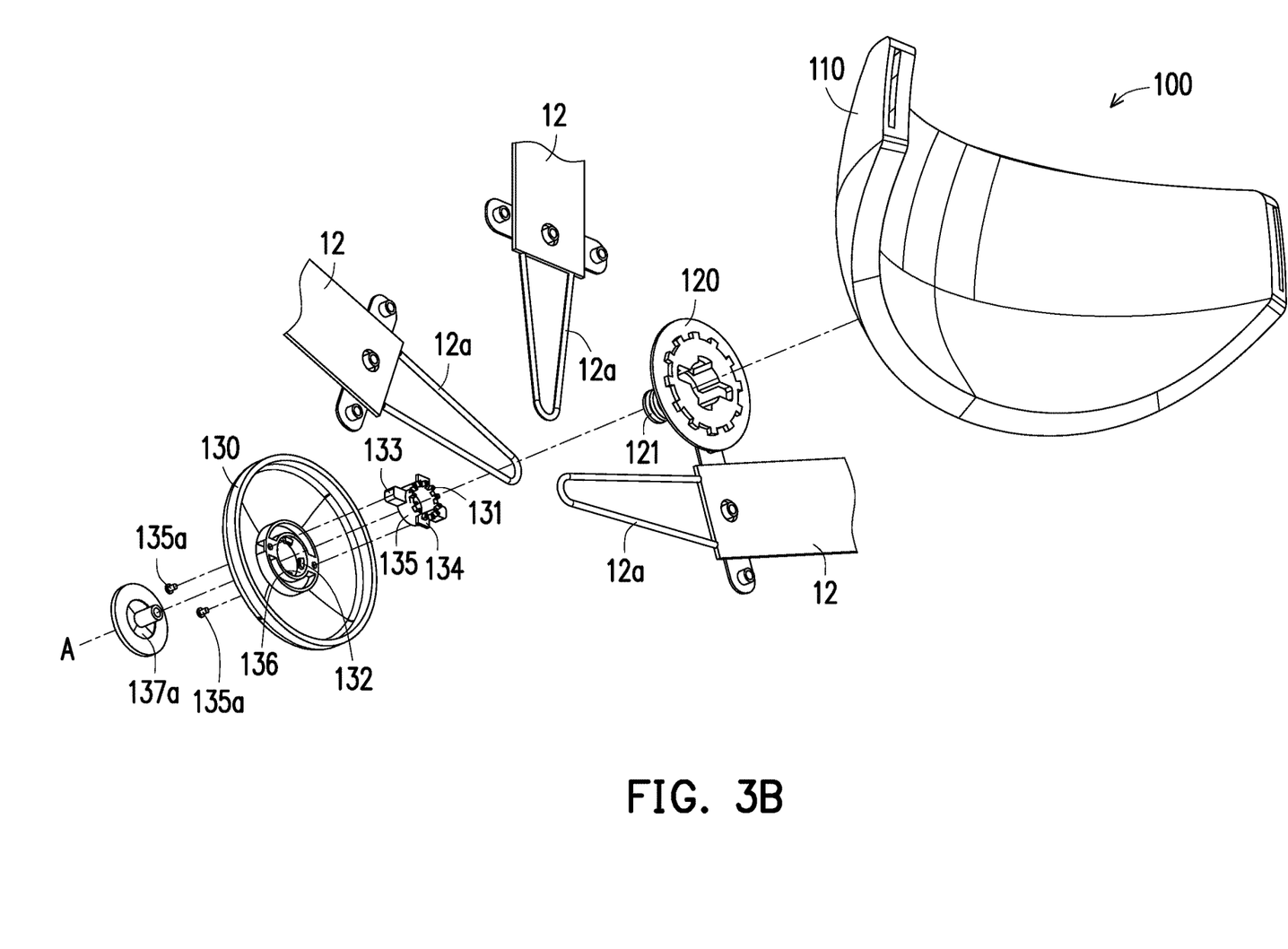
FIG. 3B is an exploded view of some components of the head-mounted display device of FIG. 3A at another angle of view.

Referring to FIG. 3A and FIG. 3B, the adjustment mechanism 100 includes a base 110, a turntable 120, and a knob 130. In the embodiment, a portion of the base 110 can form a pad against the head of the user.

Referring to FIG. 3A and FIG. 3B, the turntable 120 is pivoted to the base 110 along an axis of rotation A and has a plurality of satellite points 121. The satellite points 121 surround the axis of rotation A. The satellite points 121 can be cylinders, triangular cylinders, polygonal cylinders, trapezoidal cylinders, or cylinders having a hook, wherein the hook can be used to buckle the headbands 12. Each of the satellite points 121 is spaced apart from the axis of rotation A, and another end of each of the headbands 12 is connected to the corresponding satellite point 121. In the embodiment, the headbands 12 can include a string or rope, and the string or rope can wrap each of the satellite points 121, and when the locations of the satellite points 121 are changed via rotation, the distance between the front piece 11 and the adjustment mechanism 100 is adjusted by pulling the string or rope. Each of the headbands 12 may have an elastic string 12a to be connected to the corresponding satellite point 121. Moreover, each of the satellite points 121 can be a cylinder having an annular groove to be wrapped by the corresponding elastic string 12a. A brake structure can be disposed inside the satellite points 121 to limit the movement of the headbands 12 inside the turntable 120.

Referring to FIG. 3A and FIG. 3B, the knob 130 is pivoted to the base 110 along the axis of rotation A to drive the turntable 120 to rotate relative to the base 110 on the axis of rotation A. The base 110 has a first rotation limiting portion 111 and a first locking portion 112. The knob 130 has a second rotation limiting portion 131 and a second locking portion 132. The first rotation limiting portion 111 is adapted to be fitted with the second rotation limiting portion 131 to limit the rotation of the knob 130 relative to the base 110 on the axis of rotation A. The first locking portion 112 is adapted to be fitted with the second locking portion 132 to ensure the cooperation between the first rotation limiting portion 111 and the second rotation limiting portion 131. In the embodiment, the first rotation limiting portion 111 and the second rotation limiting portion 131 can respectively be a pair of crown gears surrounding the axis of rotation A that can be engaged with each other.

Figure 4A:
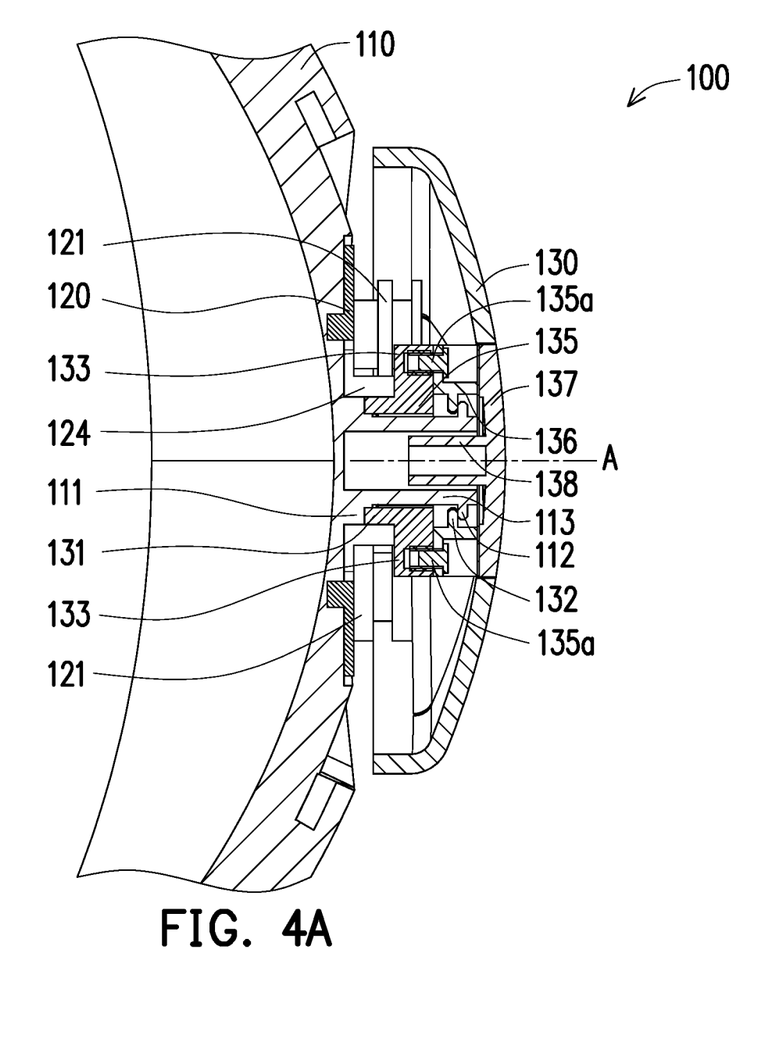
FIG. 4A is a cross-sectional view of some components of the head-mounted display device of FIG. 2 in a locked state.

Referring to FIG. 3A, FIG. 3B, and FIG. 4A, when the first locking portion 112 and the second locking portion 132 fit each other, the second rotation limiting portion 131 and the first rotation limiting portion 111 fit each other to prevent the turntable 120 from rotating relative to the base 110 on the axis of rotation A.

Figure 4B:
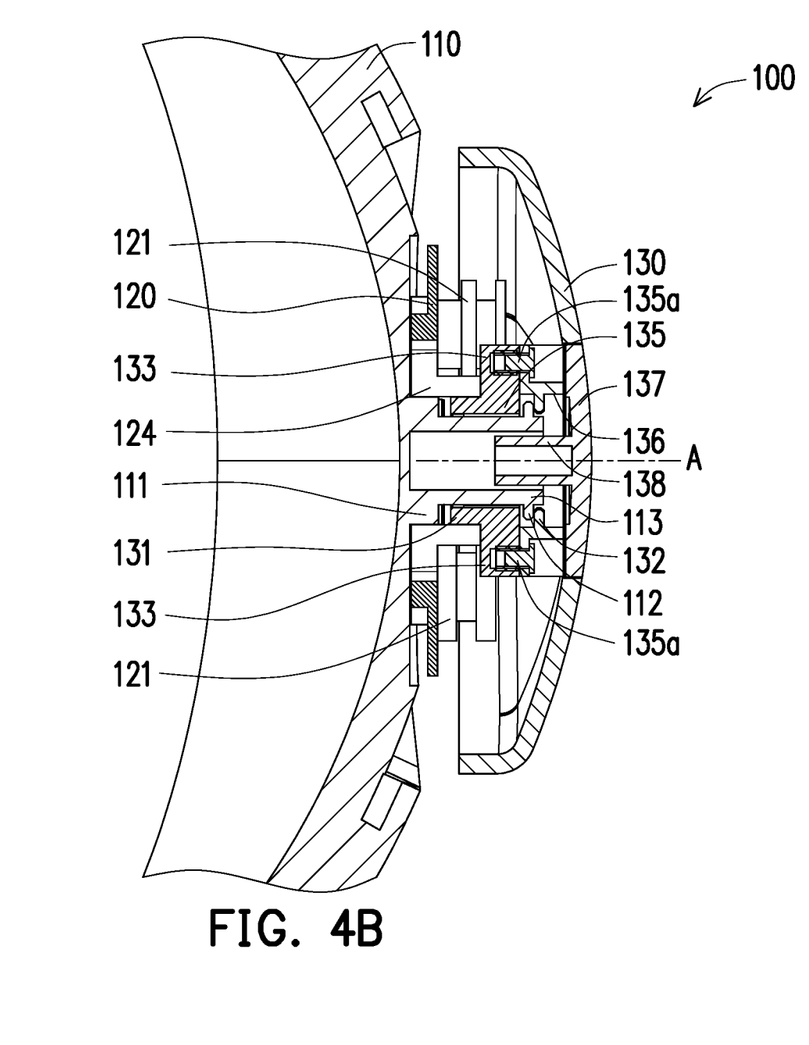
FIG. 4B is a cross-sectional view of some components of the head-mounted display device of FIG. 4A in a non-locking state.
Figure 5A:
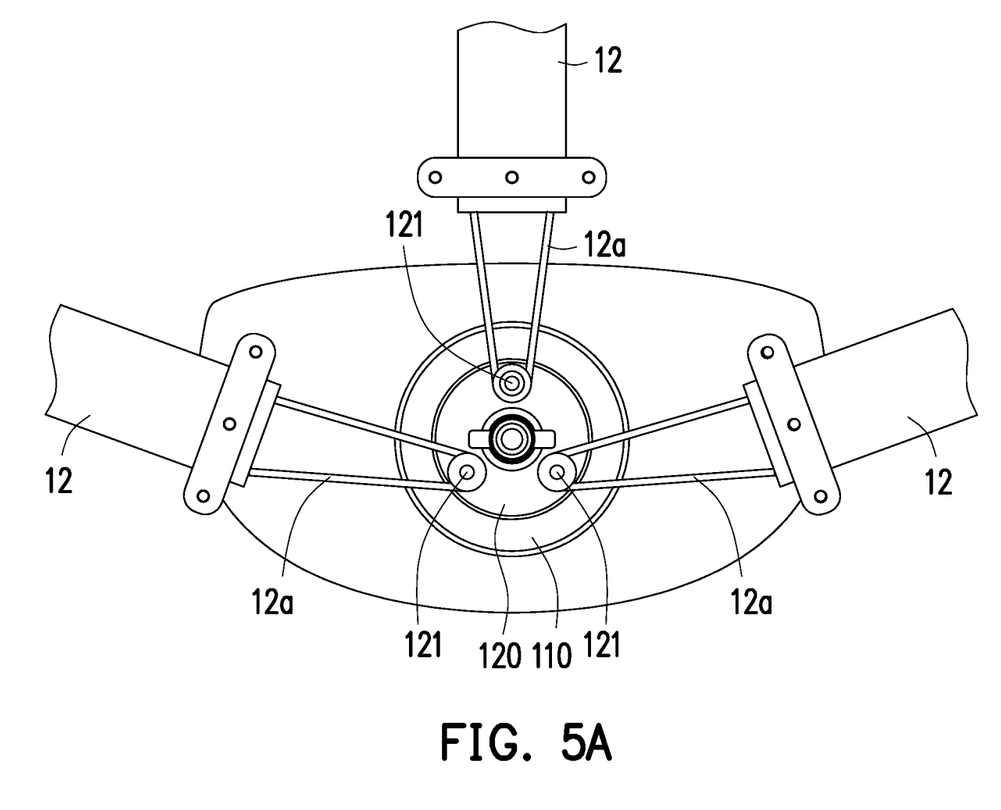
FIG. 5A is a front view of some components of the head-mounted display device of FIG. 2 in a non-rotating state.
Figure 5B:
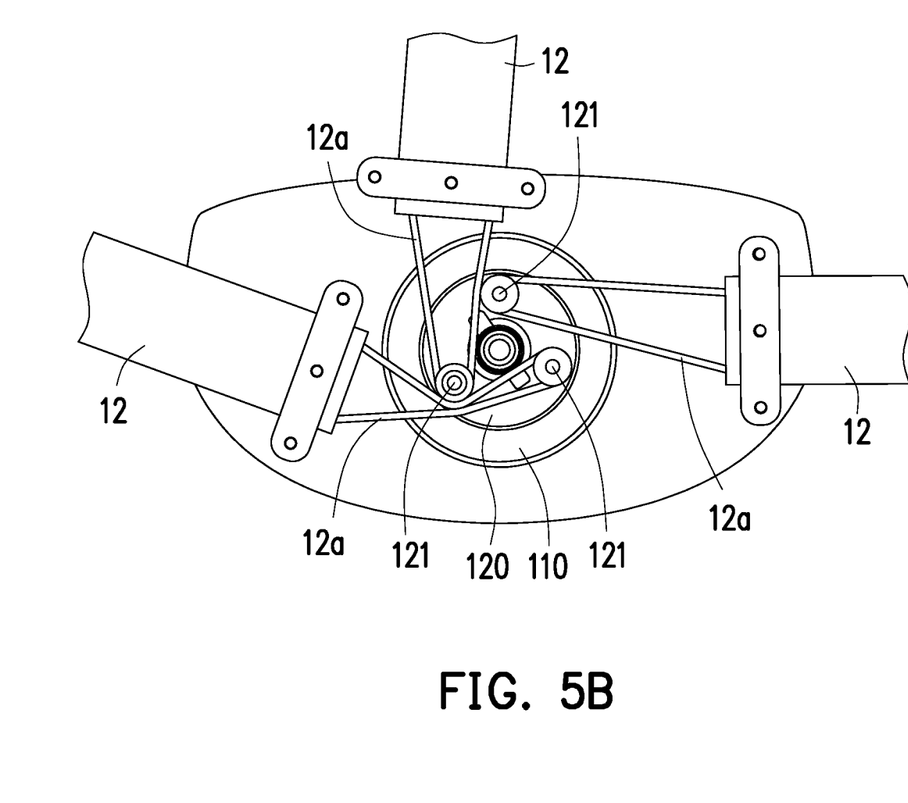
FIG. 5B is a front view of some components of the head-mounted display device of FIG. 5A in a rotating state.

Referring to FIG. 3A, FIG. 3B, and FIG. 4B, when the knob 130 is translated relative to the base 110 on the axis of rotation A (i.e., the knob 130 is pulled away from the base 110) such that the second locking portion 132 is separated from the first locking portion 112 and the second rotation limiting portion 131 is separated from the first rotation limiting portion 111, turning the knob 130 relative to the base 110 on the axis of rotation A can rotate the turntable 120 relative to the base 110 on the axis of rotation A such that the headbands 12 are wound around the periphery of the satellite points 121, as shown in FIG. 5A and FIG. 5B. For instance, the headbands 12 can be wound around the periphery of a polygon formed by the satellite points 121 such that the elastic strings 12a of the headbands 12 are wound around the periphery of the satellite points 121. Moreover, in another embodiment not shown, when the quantity of the headbands 12 is two and the quantity of the satellite points 121 is also correspondingly two, the headbands 12 can also be wound around the periphery of an I-shaped segment formed by the two satellite points 121.

In the embodiment, the turntable 120 may have a first rotation driving portion 122, the knob 130 has a second rotation driving portion 133, and the second rotation driving portion 133 and the first rotation driving portion 122 fit each other to drive the translation of the turntable 120 relative to the base 110 on the axis of rotation A. Moreover, the turntable 120 may have a first translation limiting portion 123, the knob 130 has a second translation limiting portion 134, and the second translation limiting portion 134 and the first translation limiting portion 123 fit each other to limit the translation of the turntable 120 relative to the knob 130 on the axis of rotation A.

Referring further to FIG. 3A, FIG. 3B, and FIG. 4A, after the knob 130 is turned to drive the turntable 120 to wound or loosen the headbands 12 to a suitable length of use, the knob 130 can be translated again relative to the base 110 on the axis of rotation A (i.e., pushing the knob 130 back toward the base 110) such that the second locking portion 132 and the first locking portion 112 fit each other again and the second rotation limiting portion 131 and the first rotation limiting portion 111 fit each other again. Therefore, the turntable 120 cannot be rotated relative to the base 110 on the axis of rotation A so as to maintain the length of use of the headbands 12 after the adjustment. In the embodiment, as shown in FIG. 4A, when the knob 130 is pushed back toward the base 110, a portion of the turntable 120 is embedded in the base 110 to ensure the turntable 120 cannot be rotated relative to the base 110 on the axis of rotation A.

Referring further to FIG. 3A, FIG. 3B, and FIG. 4B, in the embodiment, when the second locking portion 132 is separated from the first locking portion 112, the first locking portion 112 limits the translation of the knob 130 relative to the base 110 on the axis of rotation A.

Referring further to FIG. 3A, FIG. 3B, FIG. 4A, and FIG. 4B, in the embodiment, the turntable 120 has a first axial sleeve 124, the knob 130 has a second axial sleeve 135, and the second axial sleeve 135 is fitted with the first axial sleeve 124 to be translated relative to the base 110 on the axis of rotation A. In the embodiment, the first axial sleeve 124 can form the first rotation driving portion 122 and the first translation limiting portions 123, and the second axial sleeve 135 can form the second rotation driving portions 133 and the second translation limiting portions 134. When the second locking portion 132 is separated from the first locking portion 112, the first locking portion 112 limits the translation of the second axial sleeve 135 on the axis of rotation A to limit the translation of the knob 130 relative to the base 110 on the axis of rotation A.

In the embodiment, the second axial sleeve 135 is structurally independent from the knob 130 and is integrally formed with the second rotation driving portions 133. The second axial sleeve 135 may be connected to the knob 130 by fastening the second rotation driving portions 133 to the knob 130 via a plurality of fastening members 135a (such as screws). Moreover, in the embodiment, the second rotation limiting portion 131 and the second translation limiting portions 134 are also integrally formed with the second axial sleeve 135.

Referring further to FIG. 3A, FIG. 3B, FIG. 4A, and FIG. 4B, in the embodiment, the base 110 may have a third axial sleeve 113, and the third axial sleeve 113 is disposed in the first axial sleeve 124 and the second axial sleeve 135 to be translated relative to the base 110 on the axis of rotationA. The knob 130 may have a axial hole 136, a hole cover 137, and a fourth axial sleeve 138. The second locking portion 132 is located inside the axial hole 136. The hole cover 137 can be installed to the knob 130 to seal an end of the axial hole 136. The fourth axial sleeve 138 is disposed in the third axial sleeve 113 and can be integrally formed with the hole cover 137.

Based on the above, in the embodiments of the application, the length of use of a plurality of headbands can be simultaneously adjusted via an adjustment mechanism to reduce the time of positioning the head-mounted display device to the head of the user.

Although the application has been disclosed by the above embodiments, they are not intended to limit the application. It is apparent to one of ordinary skill in the art that modifications and variations to the application may be made without departing from the spirit and scope of the application. Accordingly, the protection scope of the application will be defined by the appended claims.

What is claimed is:

1. A head-mounted display device, comprising:
   a front piece provided with or adapted to house a display device;
   a plurality of headbands, wherein an end of each of the headbands is connected to the front piece; and
   an adjustment mechanism, comprising:
      a base;
      a turntable pivoted to the base along an axis of rotation and having a plurality of satellite points, wherein each of the satellite points is spaced apart from the axis of rotation, and another end of each of the headbands has an elastic string to be connected to the corresponding satellite point; and
      a knob pivoted to the base along the axis of rotation to drive the turntable to rotate relative to the base on the axis of rotation, wherein turning the knob relative to the base on the axis of rotation can rotate the turntable relative to the base on the axis of rotation such that the headbands are wound around a periphery of the satellite points.

2. The head-mounted display device of claim 1, wherein the base has a first rotation limiting portion and a first locking portion, the knob has a second rotation limiting portion and a second locking portion, when the first locking portion and the second locking portion fit each other, the second rotation limiting portion and the fist rotation limiting portion fit each other to prevent the turntable from rotating relative to the base on the axis of rotation, and when the knob is translated relative to the base on the axis of rotation such that the second locking portion is separated from the first locking portion and the second rotation limiting portion is separated from the first rotation limiting portion, turning the knob relative to the base on the axis of rotation can rotate the turntable relative to the base on the axis of rotation such that the headbands are wound around the periphery of the satellite points.

3. The head-mounted display device of claim 2, wherein the first rotation limiting portion and the second rotation limiting portion are respectively a pair of crown gears surrounding the axis of rotation that can be engaged with each other.

4. The head-mounted display device of claim 2, wherein when the second locking portion is separated from the first locking portion, the first locking portion limits a translation of the knob relative to the base on the axis of rotation.

5. The head-mounted display device of claim 1, wherein a portion of the base forms a pad.

6. The head-mounted display device of claim 1, wherein each of the satellite points is a cylinder having an annular groove to be wound by the corresponding elastic string.

7. The head-mounted display device of claim 1, wherein the turntable has a first rotation driving portion, the knob has a second rotation driving portion, and the second rotation driving portion and the first rotation driving portion fit each other to drive a translation of the turntable relative to the base on the axis of rotation.

8. The head-mounted display device of claim 1, wherein the turntable has a first translation limiting portion, the knob has a second translation limiting portion, and the second translation limiting portion and the first translation limiting portion fit each other to limit a translation of the turntable relative to the knob on the axis of rotation.

9. The head-mounted display device of claim 1, wherein the turntable has a first axial sleeve, the knob has a second axial sleeve, and the second axial sleeve is fitted with the first axial sleeve to be translated relative to the base on the axis of rotation.

10. The head-mounted display device of claim 9, wherein when the second locking portion is separated from the first locking portion, the first locking portion limits a translation of the second axial sleeve on the axis of rotation to limit a translation of the knob relative to the base on the axis of rotation.

11. The head-mounted display device of claim 9, wherein the base has a third axial sleeve, and the third axial sleeve is disposed in the first axial sleeve and the second axial sleeve to be translated relative to the base on the axis of rotation.

12. The head-mounted display device of claim 9, wherein the knob has a axial hole, a hole cover, and a fourth axial sleeve, the second locking portion is located inside the axial hole, the hole cover seals an end of the axial hole, and the fourth axial sleeve is disposed in the third axial sleeve.

\* \* \* \* \*